(12) United States Patent
Hu (10) Patent No.: US 8,695,673 B2
(45) Date of Patent: Apr. 15, 2014

(54) LAMINATOR WITH A CORNER CUTTER

(75) Inventor: Chih-Wei Hu, Taichung (TW)

(73) Assignee: Apex Mfg. Co., Ltd., Taichung Hsien (TW)

( * ) Notice: Subject to any disclaimer, the term of this patent is extended or adjusted under 35 U.S.C. 154(b) by 338 days.

(21) Appl. No.: 13/286,851

(22) Filed: Nov. 1, 2011

(65) Prior Publication Data

US 2013/0075042 A1 Mar. 28, 2013

(30) Foreign Application Priority Data

Sep. 27, 2011 (TW) .............................. 100134833 A (51) Int. Cl.
*B30B 5/02* (2006.01)
*B30B 5/04* (2006.01)
*B29C 65/00* (2006.01)
*B29C 65/02* (2006.01)

(52) U.S. Cl.
USPC ........ 156/583.1; 156/267; 156/510; 156/516; 156/518; 156/530; 156/583.2; 156/583.3

(58) Field of Classification Search
USPC .............. 156/267, 510, 516, 518, 530, 583.1, 156/583.2, 583.3; 7/158, 160
See application file for complete search history.

(56) References Cited

U.S. PATENT DOCUMENTS

| D392,323 S | * | 3/1998 | Appelbaum | .................... D19/72 |
| 5,783,029 A | * | 7/1998 | Stettner et al. | ................. 156/510 |
| 2006/0162841 A1 | * | 7/2006 | Hong | ............................... 156/64 |
| 2006/0185782 A1 | * | 8/2006 | Arishiro et al. | ............ 156/89.12 |

FOREIGN PATENT DOCUMENTS

JP 2008200807 * 9/2008

* cited by examiner

*Primary Examiner* — Mark A Osele
*Assistant Examiner* — Christopher C Caillouet
(74) *Attorney, Agent, or Firm* — Muncy, Geissler, Olds & Lowe, P.C.

(57) ABSTRACT

The present invention provides a laminator with a corner cutter including a main body, a laminating device and a cutting device. The main body includes a receiving space. The main body is horizontally formed with an entering slot, an exiting slot, a penetrating groove and a corner-cutting recess. The main body having two lateral sides formed between the entering slot and the exiting slot, the corner-cutting recess being disposed at one of the lateral sides. The laminating device disposed in the receiving space includes two rolling rods, a driving portion and two heaters. The two rolling rods are heated by the two heating members. The driving portion drives the two rolling rods to rotate. The cutting device includes a pushing portion and a cutting portion. The cutting device is disposed at one side of the receiving space where corresponding to the corner-cutting recess.

9 Claims, 7 Drawing Sheets

LAMINATOR WITH A CORNER CUTTER

BACKGROUND OF THE INVENTION

1. Field of the Invention

The present invention relates to a laminating machine, more particularly to a laminator with a round corner cutter that cut a round corner on a paper with a film.

2. Description of the Prior Art

Normally speaking, a very important or memorable document, such as certificate of merits, credentials . . . etc, would be protected by a laminating film. The corners of the most laminating film are round. However, there are few laminating films' corners are still undecorated right angles in the market. Therefore, users have to cut the right angle corners into round corners manually. Otherwise, the users would be stabbed or cut by these undecorated right angles.

On the other hand, there are many sizes of the laminating films sold in the market. The smallest size of the laminating film is B5 size (192×267 mm). However, if the document is smaller than B5 size of the laminating film, users have to cut the laminating film into fit the document after the document is laminated. While the users have a number of documents has been laminated, the users would consume much time and energy cutting right angle corners of the laminating films manually. In a work environment which is particular as to efficiency, this problem actually restrict to enhance the working efficiency.

Moreover, in contrast to cut a round corner for the laminating films by a cutting machine, it is not smooth for the round corner manually. The radian of each corner is different that influence the appearance of the laminated object. The present invention is, therefore, arisen to obviate or at least mitigate the above mentioned disadvantages.

SUMMARY OF THE INVENTION

The main object of the present invention is to provide a laminator with a corner cutter which is used for cutting corners of a paper or a laminating film.

To achieve the above, a laminator with a corner cutter of the present invention comprises a main body, a laminating device, and a cutting device.

The main body comprises a receiving space. The main body is horizontally formed with an entering slot and an exiting slot. The main body is formed with a penetrating groove and a corner-cutting recess. The entering slot corresponds to the exiting slot. The main body has two lateral sides formed between the entering slot and the exiting slot. The corner-cutting recess is disposed at one of the lateral sides. Wherein the main body further comprises a control panel. The main body makes a temperature of the laminating device show on the control panel.

The laminating device comprises at least two rolling rods, a transmitting portion, and two heaters. The laminating device is disposed in the receiving space. The rolling rods are horizontally disposed between the entering slot and the exiting slot so that the rolling rods are parallel with the entering slot and the exiting slot. A clamping point of the rolling rods corresponds to the entering slot and the exiting slot. One end of each rolling rod is connected to the transmitting portion. The transmitting portion drives the rolling rods to revolve so that the rolling direction of each rolling rod is defined from the entering slot to the exiting slot. At the same time, the heaters heat up the rolling rods.

The cutting device comprises a pushing portion and a cutting portion. The cutting device is disposed at one side of the receiving space where corresponding to the corner-cutting recess. The pushing portion corresponds to the penetrating groove. The pushing portion is disposed on a top of the cutting portion. The pushing portion is capable of moving between a first position and a second position. When the pushing portion is moved to the second position, the pushing portion and the cutting portion cross each other so as to achieve a function for cutting corner.

As such, the present invention combines the functions of the normal laminator and the round corner cutter so that the users may cut the corners of the laminating film more conveniently. The shape and size of the corners are the same. The present invention does not only operate easily, but make the laminated documents more delicate and lovely.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
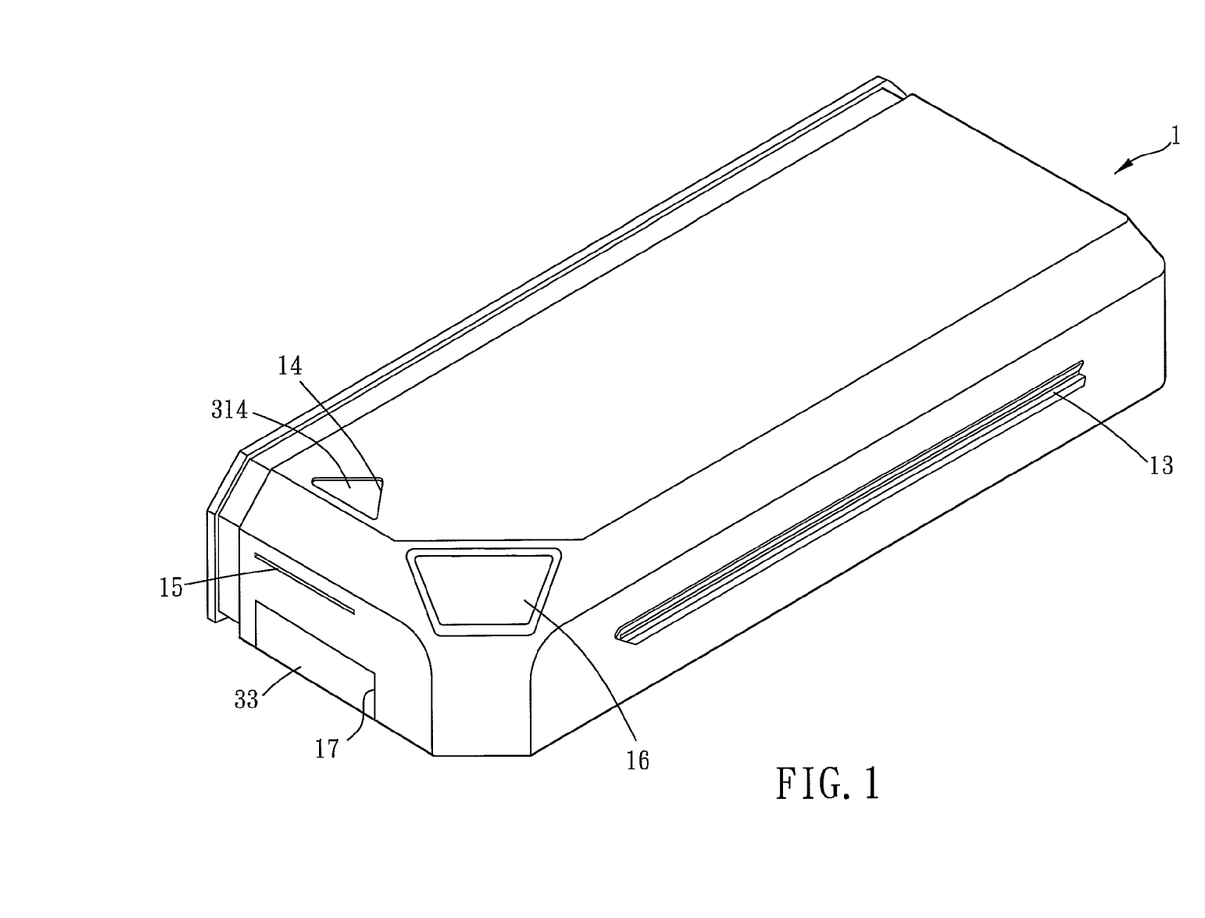
FIG. 1 is a stereogram in accordance with the first embodiment of the present invention.
Figure 2:
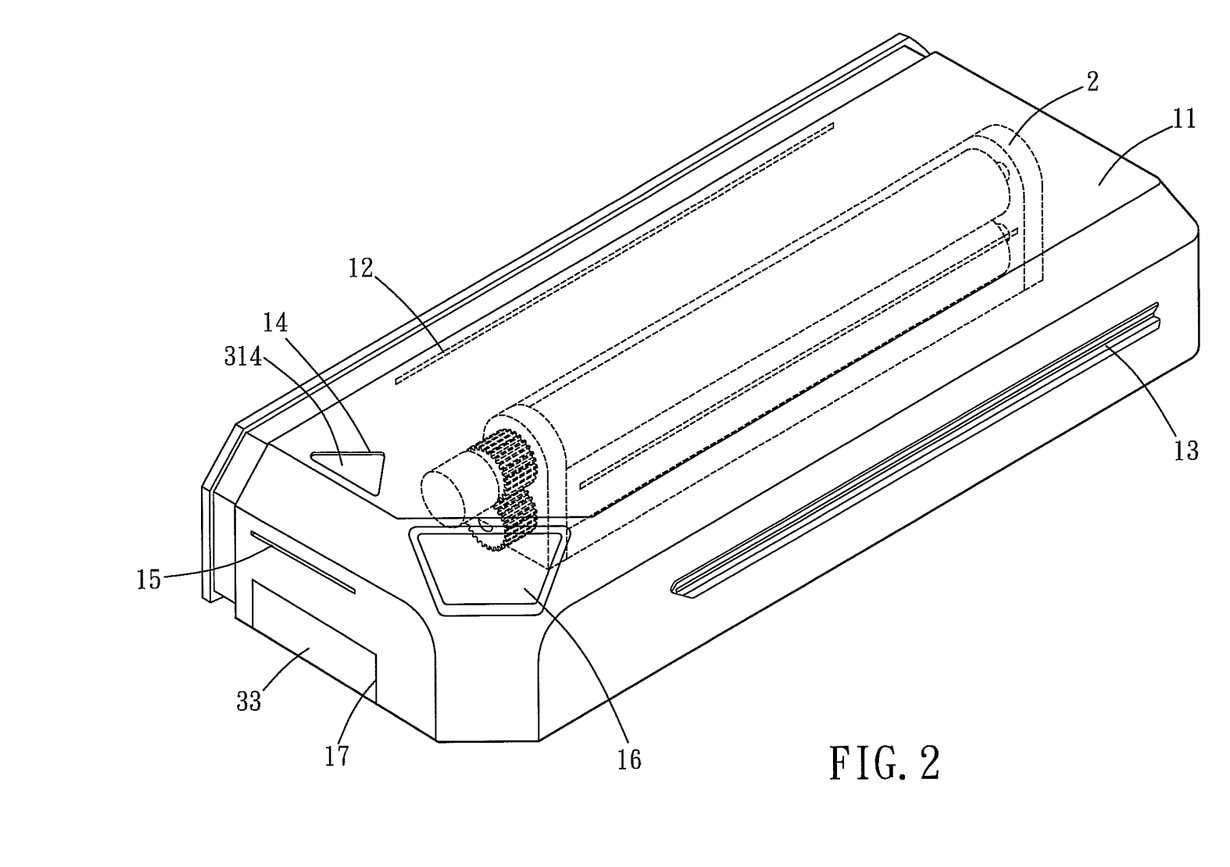
FIG. 2 is a perspective view in accordance with the first embodiment of the present invention.

Please refer to FIG. 1 and FIG. 2, a laminator with a corner cutter of the present invention comprises a main body 1, a laminating device 2, and a cutting device 3.

Please refer to FIG. 2, in this embodiment, the main body 1 comprises a receiving space 11. The main body 1 is horizontally formed with an entering slot 12 and an exiting slot 13. The main body 1 is formed with a penetrating groove 14 and a corner-cutting recess 15. The entering slot 12 corresponds to the exiting slot 13. The main body 1 has two lateral sides formed between the entering slot 12 and the exiting slot 13. The corner-cutting recess 15 is disposed at one of the lateral sides. Wherein the main body 1 further comprises a control panel 16. The main body 1 makes a temperature of the laminating device 2 show on the control panel 16. Preferably, the main body 1 is formed with a drawer opening 17. The drawer opening 17 is located under the corner-cutting recess 15.

Figure 3:
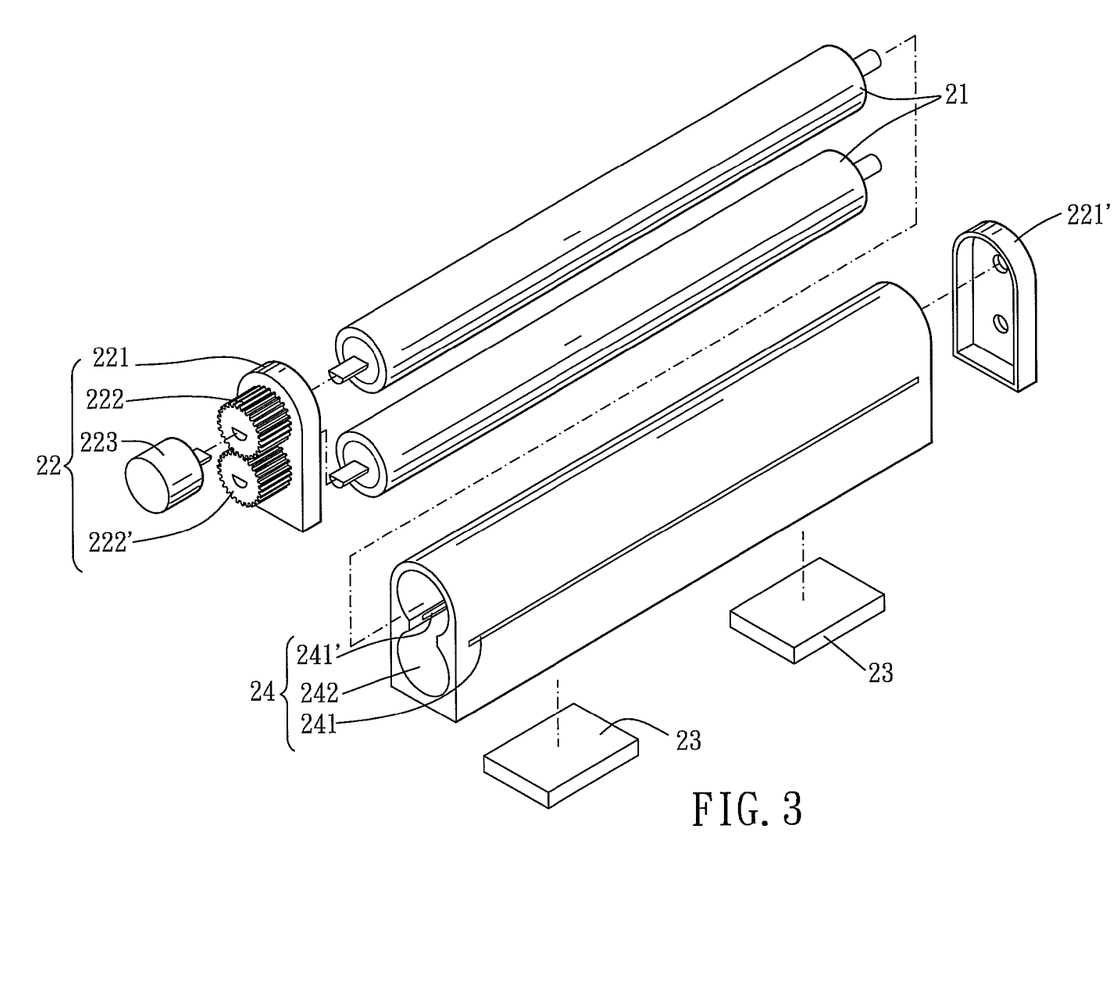
FIG. 3 is an exploded view showing the laminating device of the first embodiment of the present invention.

In the present embodiment, as shown in FIG. 2 and FIG. 3, the laminating device 2 comprises at least two rolling rods 21, a transmitting portion 22, and at least a heater 23. Preferably, the laminating device 2 comprises two heaters 23. The laminating device 2 is disposed in the receiving space 11. The rolling rods 21 are horizontally disposed between the entering slot 12 and the exiting slot 13 so that the rolling rods 21 are parallel with the entering slot 12 and the exiting slot 13. A clamping point of the rolling rods 21 corresponds to the entering slot 12 and the exiting slot 13. One end of each rolling rod 21 is connected to the transmitting portion 22. The transmitting portion 22 drives the rolling rods 21 to revolve so that the rolling direction of each rolling rod 21 is defined from the entering slot 12 to the exiting slot 13. At the same time, the heaters 23 heat up the rolling rods 21. Furthermore, the laminating device 2 further comprises a housing aperture base 24. The housing aperture base 24 comprises two openings 241, 241' and a housing aperture 242. The openings 241, 241' communicate with the housing aperture 242. One of the openings 241' corresponds to the entering slot 12, the other one of the openings 241 corresponds to the exiting slot 13. The rolling rods 21 are disposed in the housing aperture 242. The heaters 23 are disposed on a bottom of the housing aperture base 24. Whereby the heaters can heat up the rolling rods 21 by the housing aperture base 24 so that the thermal energy may conduct to the rolling rods 21 uniformly. The rolling rods can laminate a laminating object well. Wherein the transmitting portion 22 comprises two brackets 221, 211', two gears 222, 222', and a driving device 223. The brackets 221, 221' are disposed at two sides of the housing aperture 24 individually. The brackets 221, 221' correspond to the housing aperture 242 individually. One ends of the rolling rods 21 are connected to one of the brackets 221, the other ends of the rolling rods 222, 222' are connected to each gear 222, 222' and the other one of the brackets 221'. The driving device 223 is connected to the gear 222. The driving device 223, the gears 222, 222', and the rolling rods 21 achieve a linking relation with each other.

Figures 4, 4A:
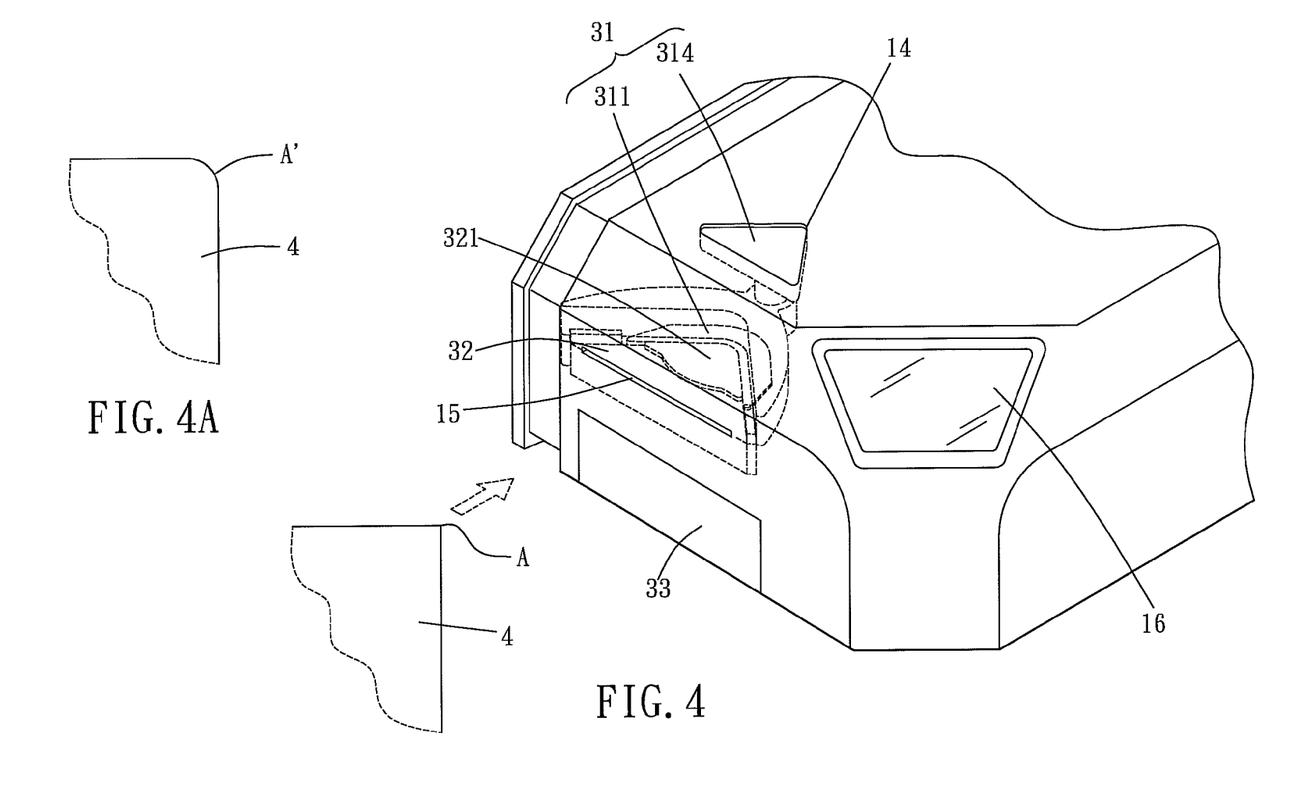
FIG. 4 is a perspective view showing the cutting device of the first embodiment of the present invention.
FIG. 4A is a schematic drawing showing the appearance of the corner of the first embodiment of the present invention.
Figure 5:
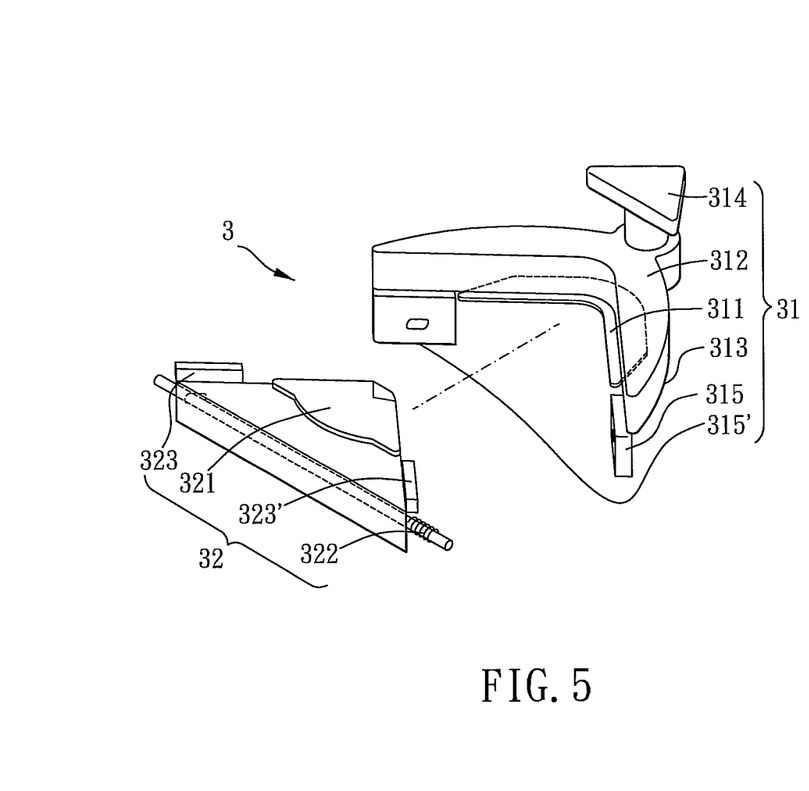
FIG. 5 is a structure drawing showing the cutting device of the first embodiment of the present invention.
Figure 5A:
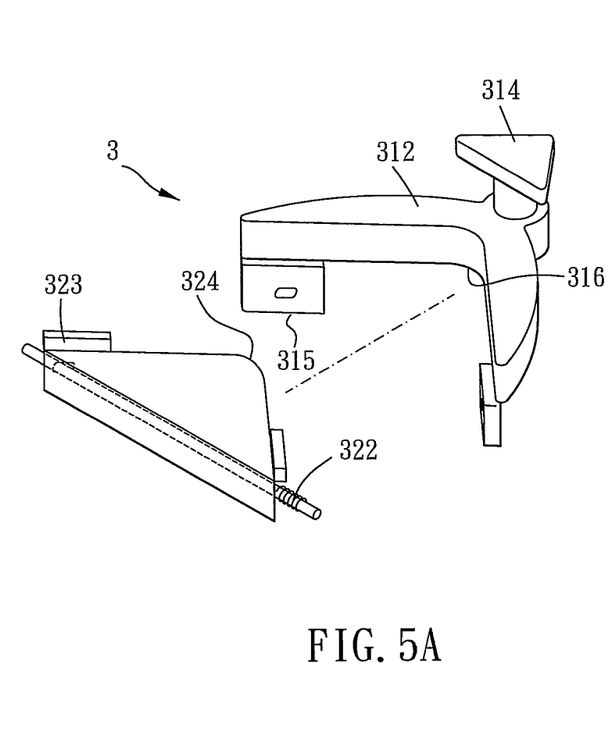
FIG. 5A is a structure drawing showing the cutting device of another embodiment of the present invention.
Figure 5B:
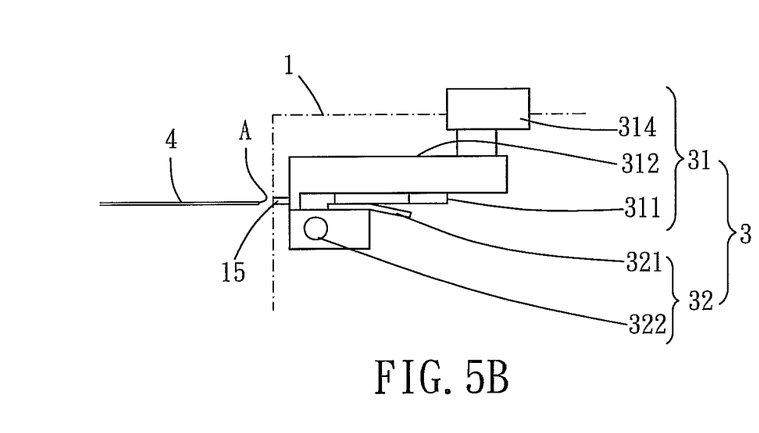
FIG. 5B to FIG. 5C are side views showing motion conditions of the cutting device of the first embodiment of the present invention.
Figure 5C:
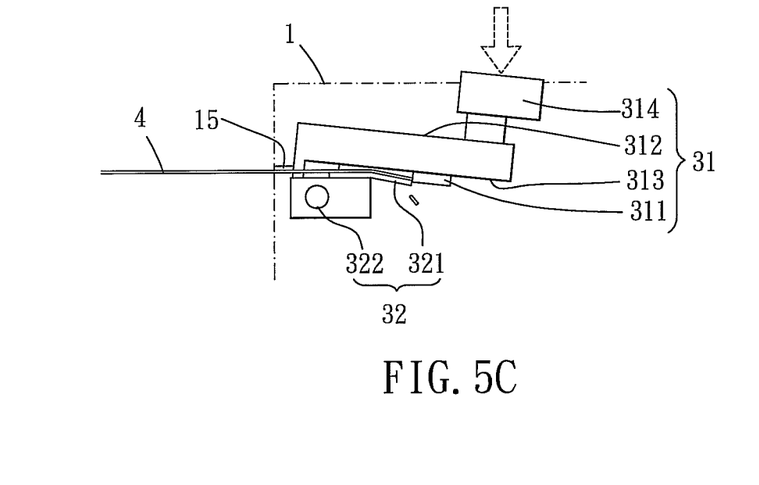

Please refer to FIG. 4 and FIG. 5, the cutting device 3 comprises a pushing portion 31 and a cutting portion 32. The cutting device 3 is disposed at one side of the receiving space 11 where corresponding to the corner-cutting recess 15. The pushing portion 31 corresponds to the penetrating groove 14. The pushing portion 31 is disposed on a top of the cutting portion 32. The pushing portion 31 is capable of moving between a first position and a second position. When the pushing portion 31 is moved to the second position, the pushing portion 31 and the cutting portion 32 cross each other. As shown in FIG. 5B and FIG. 5C, in the present embodiment, the pushing portion 31 has an upper-cutting element 311. The cutting portion 32 has a lower-cutting element 321. The upper-cutting element 311 corresponds to the lower-cutting element 321. When the pushing portion 31 is moved to the second position, the upper-cutting element 311 and the lower-cutting element 321 cross each other. And so a corner A is cut into a round corner A', as shown in FIG. 4A. Please refer to FIG. 5, the pushing portion 31 comprises a top surface 312 and a bottom surface 313. The top surface 312 corresponds to the penetrating groove 14. The top surface 312 is formed with a button 314 which protrudes out of the penetrating groove 14. Two ends of the bottom surface 313 have a joint member 315, 315' respectively. The upper-cutting element 311 is disposed between the joint members 315, 315'. The cutting portion 32 comprises a restoring element 322 and two blocking elements 323, 323'. The restoring element 322 is disposed on a bottom of the cutting portion 32. The blocking elements 323, 323' are disposed at one side of the cutting portion 32 respectively. The blocking elements 323, 323' correspond to each other. The lower-cutting element 321 is disposed between the blocking elements 323, 323'. Preferably, the cutting device 32 further comprises a drawer 33. The drawer 33 is located under the cutting portion 32 and corresponds to the drawer opening 17. The drawer is adapted for collecting the trash about the corner being cut by the cutting device 3 so as to clean the trash conveniently. In other embodiments of the present invention, please refer to FIG. 5A, when the pushing portion 31 is moved to the second position, a crossing side 316 formed on the pushing portion 31 cross to the cutting portion 32. The cutting portion 32 has a lateral side 324 corresponding to the crossing side 316. Both of the crossing side 316 and the lateral side 324 are formed by scraping means or other processing means so that each of the crossing side 316 and the lateral side 324 has a function about cutting corner.

Accordingly, when users laminate the paper in a laminating film, turn on the laminating device 2 first. The transmitting portion 22 can drive the rolling rods 2 to revolve. At the same time, the heaters can heat up the rolling rods 21 by the housing aperture base 24. And the temperature of the laminating device 21 shows on the control panel 13. More definitely, when the laminating device 2 is turned on, the driving device 223 will drive the gears 222, 222' to revolve so that the gears 222, 222' further drive the rolling rods 21 to revolve toward the rolling direction.

Figure 6:
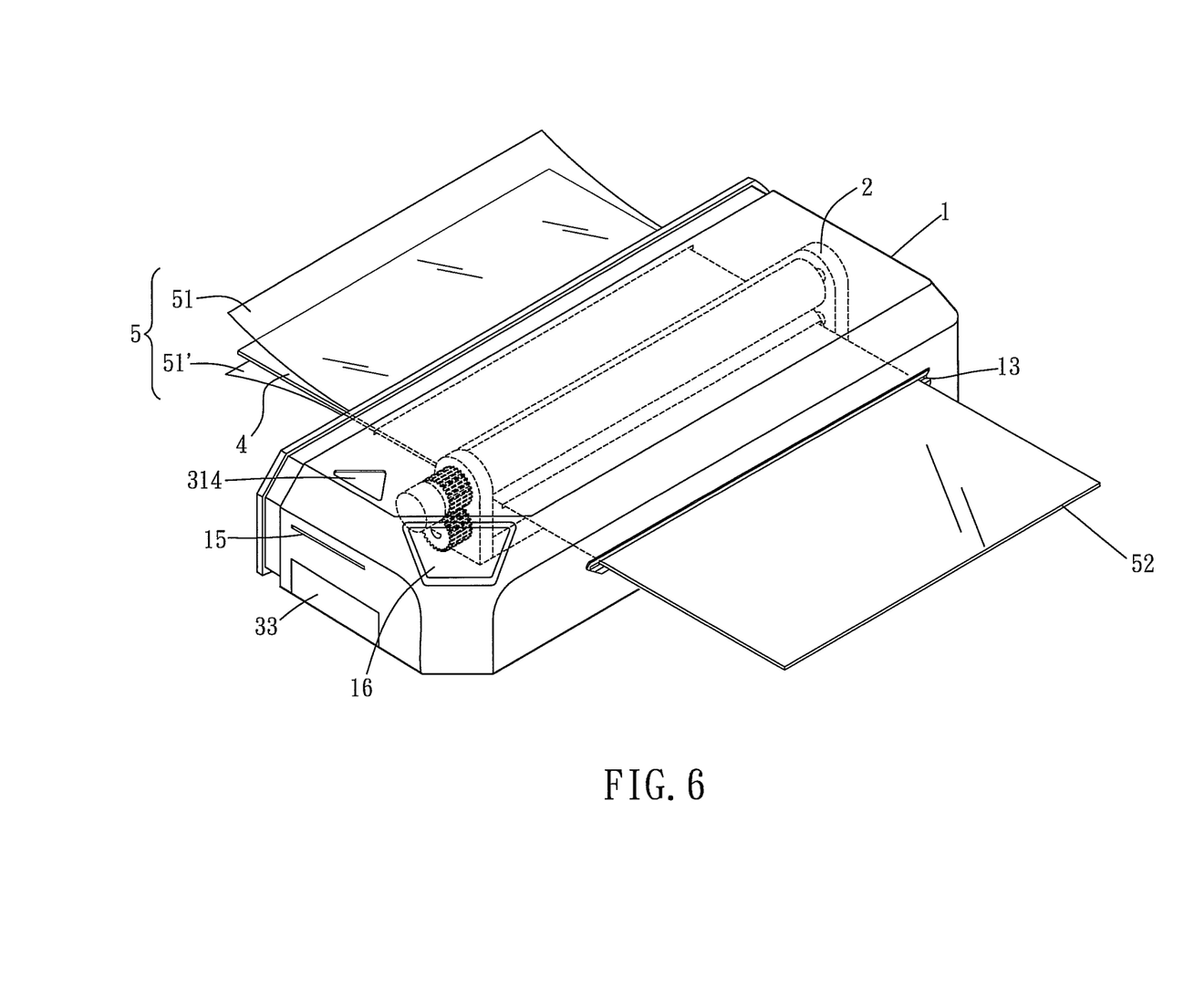
FIG. 6 is a stereogram showing the combination of the laminating device of the first embodiment of the present invention.

Please refer to FIG. 2 and FIG. 6, when the temperature raise up to a predetermined high degree, the control panel can show a signal so that the users may identify the laminating device to be heated over. The signal is lamps, colors or a set of words which can change to one another. Thereafter, the paper 4 is clamped between two laminating layers 51, 511' of the laminating film 5. Let an adhering side 52, which is formed with the laminating film after laminating, toward the entering slot 12. And then, put the adhering side 52 via the entering slot 12 into the main body 1. The paper would go through the opening 241' into the housing aperture base 24. At the moment, the laminating film 5 would be clamped between the rolling rods so the rolling rods 21 would keep revolving and pushing the laminating film 5 toward the opening 241. After the lateral side 52 goes through the opening 241, the paper would get out from the exiting slot 13. In the pushing process, the rolling rods can press and heat to the laminating film 5 at the same time. When the laminating layers 51, 51' are adhered together, the paper 4 can be sealed in the laminating film 5 completely.

After laminating process is done, the laminating film would be pushed out of the exiting slot 13. And then, as shown in FIG. 4, place the corner A of the laminating film 5 from the corner-cutting recess 15 into the cutting device 3. At the moment, the blocking element 323, 323' allow the corner A to stop in a predetermined position. The corner A is just over the edge of the lower-cutting 321. The paper 4 is not over the edge of the lower-cutting element 321. Thereafter, press the button 314 into the penetrating groove 14. The pushing portion 31 is moved from the first position downward to the second position. Please refer to FIG. 5B and FIG. 5C, when the pushing portion is moved downward, the upper-cutting element 311 would press the corner A first. When the pushing portion is moved downward continuously, it would just cross with the lower-cutting element 321. Thereafter, the corner A is cut into the round corner A', as shown in FIG. 4A. After cutting process, the restoring element 322 has the pushing portion 31 move from the second position to the first position. The button 314 protrudes out of the penetrating groove again. Besides, users can pull out the drawer so that the trash of the corner can be collected therein conveniently.

In a view of foregoing, the present invention has not only a laminating function of a laminating machine, but combines the characteristic of a round corner cutter. Users do not cut the right angle corners of the laminating films to the round corners manually after laminating process is done. The cutting efficiency can be enhanced. In addition, because the present invention has that cutting device, when users cut the laminating film, they just press the pushing portion, the corner would be cut into a smooth round corner. The shape and size of each corner is the same so as to resolve the problem about cutting the corner manually, which cause the shape and the size of each corner is very different. The laminated documents are more delicate and lovely.

What is claimed is:

1. A laminator with a corner cutter comprising:
a main body, comprising a receiving space, the main body being horizontally formed with an entering slot and an exiting slot, the main body being formed with a penetrating groove and a corner-cutting recess, the entering slot corresponding to the exiting slot, the main body having two lateral sides formed between the entering slot and the exiting slot, the corner-cutting recess being disposed at one of the lateral sides;
a laminating device, comprising at least two rolling rods, a transmitting portion, and at least a heater, the laminating device being disposed in the receiving space, the rolling rods being horizontally disposed between the entering slot and the exiting slot, a clamping point of the rolling rods corresponds to the entering slot and the exiting slot, one end of each rolling rod being connected to the transmitting portion, the transmitting portion driving the rolling rods to revolve, the heater heating up the rolling rods;
a cutting device, comprising a pushing portion and a cutting portion, the cutting device being disposed at one side of the receiving space where corresponding to the corner-cutting recess, the pushing portion corresponding to the penetrating groove, the pushing portion being disposed on a top of the cutting portion, the pushing portion being capable of moving between a first position and a second position, when the pushing portion is moved to the second position, the pushing portion and the cutting portion cross each other.

2. The laminator with a corner cutter of claim 1, wherein the main body further comprises a control panel, the main body makes a temperature of the laminating device show on the control panel.

3. The laminator with a corner cutter of claim 2, wherein the laminating device further comprises a housing aperture base, the housing aperture base comprises two openings and a housing aperture, the openings communicate with the housing aperture, one of the openings corresponds to the entering slot, the other one of the openings corresponds to the exiting slot, the rolling rods are disposed in the housing aperture, the heater is disposed on a bottom of the housing aperture base.

4. The laminator with a corner cutter of claim 3, wherein the transmitting portion comprises two brackets, at least a gear, and a driving device, the brackets are disposed at two sides of the housing aperture base individually, the brackets correspond to the housing aperture individually, one ends of the rolling rods are connected to one of the brackets, the other ends of the rolling rods are connected to the gear and the other one of the brackets, the driving device is connected to the gear, the driving device, the gear, and the rolling rods achieve a linking relation with each other.

5. The laminator with a corner cutter of claim 1, wherein the pushing portion has an upper-cutting element, the cutting portion has a lower-cutting element, the upper-cutting element corresponds to the lower-cutting element, when the pushing portion is moved to the second position, the upper-cutting element and the lower-cutting element cross each other.

6. The laminator with a corner cutter of claim 5, wherein the pushing portion comprises a top surface and a bottom surface, the top surface corresponds to the penetrating groove, the top surface is formed with a button, the button protrudes out of the penetrating groove, two ends of the bottom surface have a joint member respectively, the upper-cutting element is disposed between the joint members.

7. The laminator with a corner cutter of claim 6, wherein the main body is formed with a drawer opening, the drawer opening is located under the corner-cutting recess.

8. The laminator with a corner cutter of claim 7, wherein the cutting device further comprises a drawer, the drawer is located under the cutting portion, the drawer corresponds to the drawer opening.

9. The laminator with a corner cutter of claim 7, wherein the cutting portion comprises a restoring element and two blocking elements, the restoring element is disposed on a bottom of the cutting portion, the blocking elements are disposed at one side of the cutting portion respectively, the blocking elements correspond to each other, the lower-cutting element is disposed between the blocking elements.

* * * * *